United States Patent [19]

Llabrès

[11] 4,379,507
[45] Apr. 12, 1983

[54] OPTICAL DISK CASSETTE

[75] Inventor: Raymond Llabrès, Paris, France

[73] Assignee: Thomson-CSF, Paris, France

[21] Appl. No.: 241,112

[22] Filed: Mar. 6, 1981

[30] Foreign Application Priority Data

Mar. 7, 1980 [FR] France .................. 80 05197

[51] Int. Cl.³ .................. B65D 85/57; B65D 85/02;
G11B 5/16; G11B 17/00
[52] U.S. Cl. .................. 206/444; 206/309;
206/303; 346/137; 360/135
[58] Field of Search ............... 206/444, 309, 310, 313,
206/312, 303; 312/18; 346/137; 360/135

[56] References Cited

U.S. PATENT DOCUMENTS

| 2,785,797 | 3/1957 | Rice | 206/310 |
|---|---|---|---|
| 3,481,656 | 12/1969 | Landers | 312/18 |
| 3,951,264 | 4/1976 | Heidecker et al. | 206/444 |
| 4,076,119 | 2/1978 | Clarke | 206/309 |
| 4,084,694 | 4/1978 | Lainz et al. | 206/444 |
| 4,159,827 | 7/1979 | Torrington | 206/313 |
| 4,320,833 | 3/1982 | Antoniotti et al. | 206/309 |

Primary Examiner—William T. Dixson, Jr.
Attorney, Agent, or Firm—Cushman, Darby & Cushman

[57] ABSTRACT

A cassette for storing and handling optical disks without touching them, including in particular video disks recorded on both sides, the cassette comprising a plate contained in a plastic envelope. The plate comprises a first cavity in which the disk to be protected is positioned. An additional annular cavity is provided in the bottom surface of the plate. The cover of the envelope comprises a cavity of shape matching that of the additional annular cavity such that the recorded areas of both sides of the disk are protected. Additional conical surfaces bearing one on the other are provided in the cover and plate around the edge of the first cavity. Means for locking the plate in the envelope are also provided.

9 Claims, 10 Drawing Figures

OPTICAL DISK CASSETTE

The present invention relates to optical disk cassettes for storing and handling such disks whilst protecting them from various types of damage, and in particular to video-disk cassettes.

These cassettes are known under various names, such as container, protective cover, package, cartridge and also "caddy".

The generic name video-disk covers physical supports of high-density information allowing the recording and reading, generally by optical means, of signals more often representing television images. In the more general case of an optical data support, it can cover digital data intended for data processing systems used in informatics.

The data bits on the disk are in the form of disturbances which may be detected optically for example, having dimensions of the order of one micron.

It is therefore essential to avoid as far as possible the rubbing of objects on the surface or surfaces of the disk carrying data, and even any contact likely to apply pressure to these surfaces or deposit foreign matter, such as dust.

In the case of a flexible disk, it is moreover not possible to handle this disk by its edge as in the case of rigid disks. It is therefore necessary to design a cassette system which, in addition to storing the disk, allows its automatic reading in a reader, i.e. without operator intervention.

Many cassette systems have been proposed. The earlier systems are in forms similar to those of audio disk envelopes. In a system, which is presently on the market and uses mechanical reading devices, the disk is contained in a flexible paper envelope contained in a cardboard envelope. This envelope is inserted in a reader, where a mechanism consisting of rollers extracts the disk and transfers it to a play turntable. The flexible envelope provides poor protection of the disk and the extraction mechanism bears on the recorded surface, which may in time damage the disk. In addition, the paper envelope may be accidentally folded when being extracted manually from the cardboard envelope.

Other more recent systems comprise a drawer on the floor of which the disk rests. A first system proposed and described by the French patent application No. 75 27 928, filed on Sept. 11, 1975, and granted under the No. 2,324,089 (U.S. Pat. No. 4,084,694), is for a rigid cassette containing a rigid drawer itself carrying the video-disk. The cassette is inserted in the reader, where studs lock the unit. The envelope is then withdrawn and the unit remains held in the reader. During this last stage, the disk is drawn towards a plate possessing a prestabilization and rotation device. The disk is read optically through a slot in the plate.

A variant of this system is described in the French patent application No. 76 17 077, filed on June 4, 1976, and granted under No. 2,253,924. The cassette described in this patent application comprises a flexible envelope and a rigid plate. The envelope is drawn into the body of the reader, where it remains whilst being read.

The reader comprises a prestabilizer. Any contact between the disk and prestabilizer, which is fixed, can thus cause serious damage to the recorded surface. Moreover, the disk is not held in the unit and can move freely in the cassette. Finally, if the top lip of the cassette is distorted, it can rub on the disk when inserting into or taken out of the reader.

In order to prevent the recorded surface from rubbing on the plate fitted with a prestabilizer, another cassette arrangement was proposed in the French patent application No. 77 20 275, filed on July 1, 1977, and granted under the No. 2,396,380. This cassette comprises a plate which prestabilizes the disk and on which the disk rests on its unrecorded side. This plate has a cover which presses on the disk by means of a guard ring.

Finally, another French patent application No. 78 05 338, filed on Feb. 24, 1978, and granted under the No. 2,418,519 (U.S. Pat. No. 4,320,833), relates to a cassette with a moulded plastic plate possessing a cavity in which the disk is centered, with its unrecorded side in contact with the plate, and a cardboard envelope. The disk is held in the cavity in a central area by the contact between a multipole magnet attached to the plate and metallic lands glued to paper attached to the disk.

This latter approach, although it perfectly fulfills the functions of protecting and storing the disk, complicates the manufacture of this disk by the necessity of gluing paper with metallic lands on the plastic disk.

Finally, none of the proposed systems allows the protection and storage of disks recorded on both sides, such disks being particularly advantageous, since they are the only disks allowing the recording of long-duration features on a single support, such as full-length films or high-density optical recording.

On the contrary, the present invention, whilst retaining all the advantages including in particular those of the last patent application mentioned above, allows the protection and storage of disks recorded on both sides. It also simplifies these disks by eliminating a certain number of manufacturing parts and operations.

The subject of the present invention is therefore an optical disk cassette of the type comprising a plate possessing a first circular cavity for taking an optical disk and an envelope for containing said plate, the envelope having an opening through which the plate may be inserted and the disk possessing at least one recording area defined by two concentric circles of given first and second diameters, and a cassette in which a second annular cavity is provided at the bottom of said first cavity of inner and outer diameters respectively less than and greater than those of the first and second given diameters, and in which a third cavity also of annular shape and of dimensions virtually equal to those of said second cavity is provided in the inner surface of the envelope cover, said second and third cavities being concentric when the plate is inserted in the envelope.

The invention may be more easily understood and other advantages appear upon reading the description below, which refers to the following appended figures.

Figure 1:
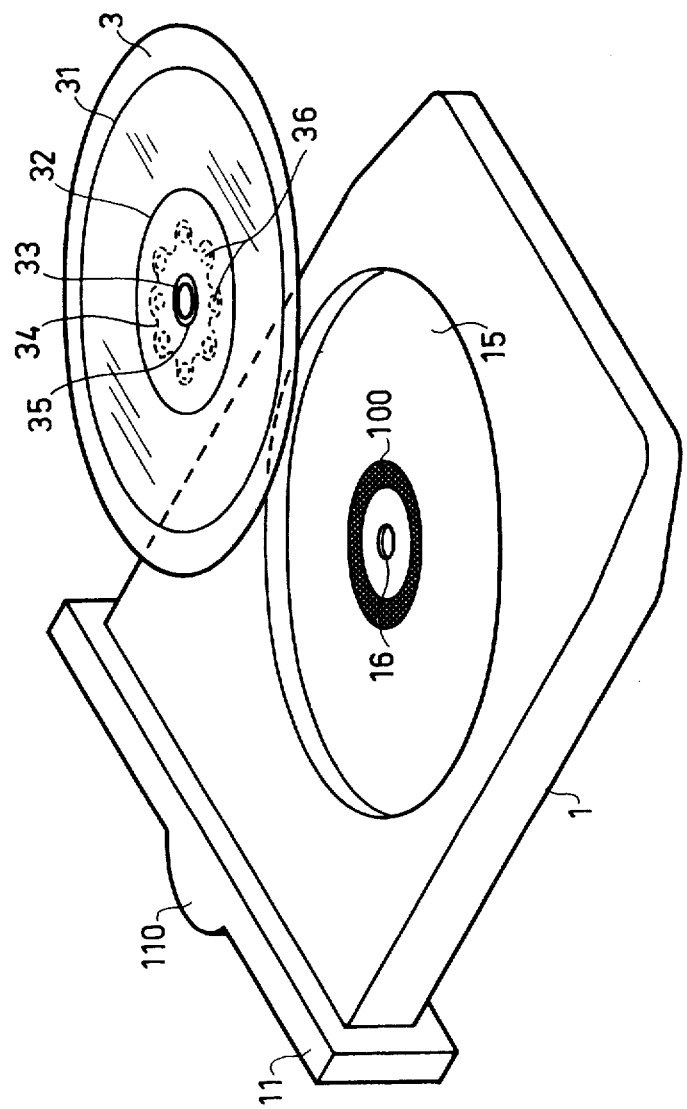
FIG. 1 illustrates a cassette of known art.

FIG. 1 illustrates a cassette of known art described in U.S. Pat. No.4,320,833. The cassette comprises a rectangular cardboard envelope with a paper liner (not shown) and a plate moulded in plastic least sensitive to electrostatic charges, such as 6.6 polyamide.

This plate 1 is rectangular in shape and its thickness has been deliberately exaggerated in the figure for the sake of clarity. Its rear edge (at the rear in the figure) is terminated by a shoulder 11 whose thickness is virtually the same as that of the envelope material. This shoulder buts against the open edge of the envelope, preventing the plate from penetrating completely inside this envelope. This arrangement therefore leaves exposed a rounded tongue 110, whose bottom surface (hidden in the figure) has a triangular recess for hooking onto an extraction stud attached to the reader. The front edge of the plate is tapered to facilitate its insertion into the envelope.

A circular cavity 15 is provided in the top surface of the plate to take the disk 3, whose recorded side faces upwards. The diameter of this cavity is slightly greater than that of the disk. A central hole 16 lets through the drive shaft of the disk 3 when the cassette is inserted in the reader.

If the cassette were limited to the means described above, the disk would move freely in the cavity 15, since it is necessary to provide radial clearance, even small, and its recorded side would come into contact with the inside of the envelope and rub on the latter, which would result in serious damage to the recording.

In order to avoid such rubbing, a circular groove is provided at the bottom of cavity 15 and concentric with this cavity, and a central hole in which a multipole magnet 100 in the form of a crown has been placed. This magnet, for example, is cut from a sheet of rubber loaded with magnetic particles which are then magnetized to produce a succession of alternating north and south poles. In order to ensure satisfactory attraction of the disk, it is advantageous for the magnet to be slightly proud with respect to the plane at the bottom of the cavity 15.

Such a magnet can attract a disk only if the latter has magnetic properties. For this purpose, a conventional flexible video-disk is modified in the manner shown in FIG. 2. This disk 3 comprises a recorded area defined by circles 31 and 32 and a central hle 33 letting through the drive shaft of the reader. A label 34 is glued to the unrecorded side and shown by a dotted line in the figure, this label possessing a central hole 35 of diameter slightly greater than that of hole 33, and whose outer edge is cut along a wavy line. This label 34 can bear an inscription and is used for carrying a number of magnetic lands 36. When the disk is placed in cavity 15 of plate 1, with its unrecorded side facing the surface of this cavity, the magnet 100 attracts the lands 36, holding the middle of the disk against this surface and thereby immobilizing it. The first result is that the unrecorded side can only touch the bottom of the cassette without relative movement with respect to the cassette, thereby considerably reducing the danger of damage due to such contact and eliminating in particular the danger of scratching. Next, when the cassette is turned over such that the opening of cavity 15 faces downwards, the recorded side of disk 3 tends to fall towards the envelope, and since it is held at its center, it curves in the form of a dish such that it touches the envelope on a circle defined by its outer edge and whose width depends on the weight of the disk, its stiffness, and the depth of cavity 15. With normal disks it is possible to obtain for a very shallow depth of the cavity a width of this bearing surface sufficiently small such that the recorded area does not touch the bottom of the cavity. The recorded side therefore cannot touch the envelope and therefore cannot be damaged by such contact.

Figure 2:
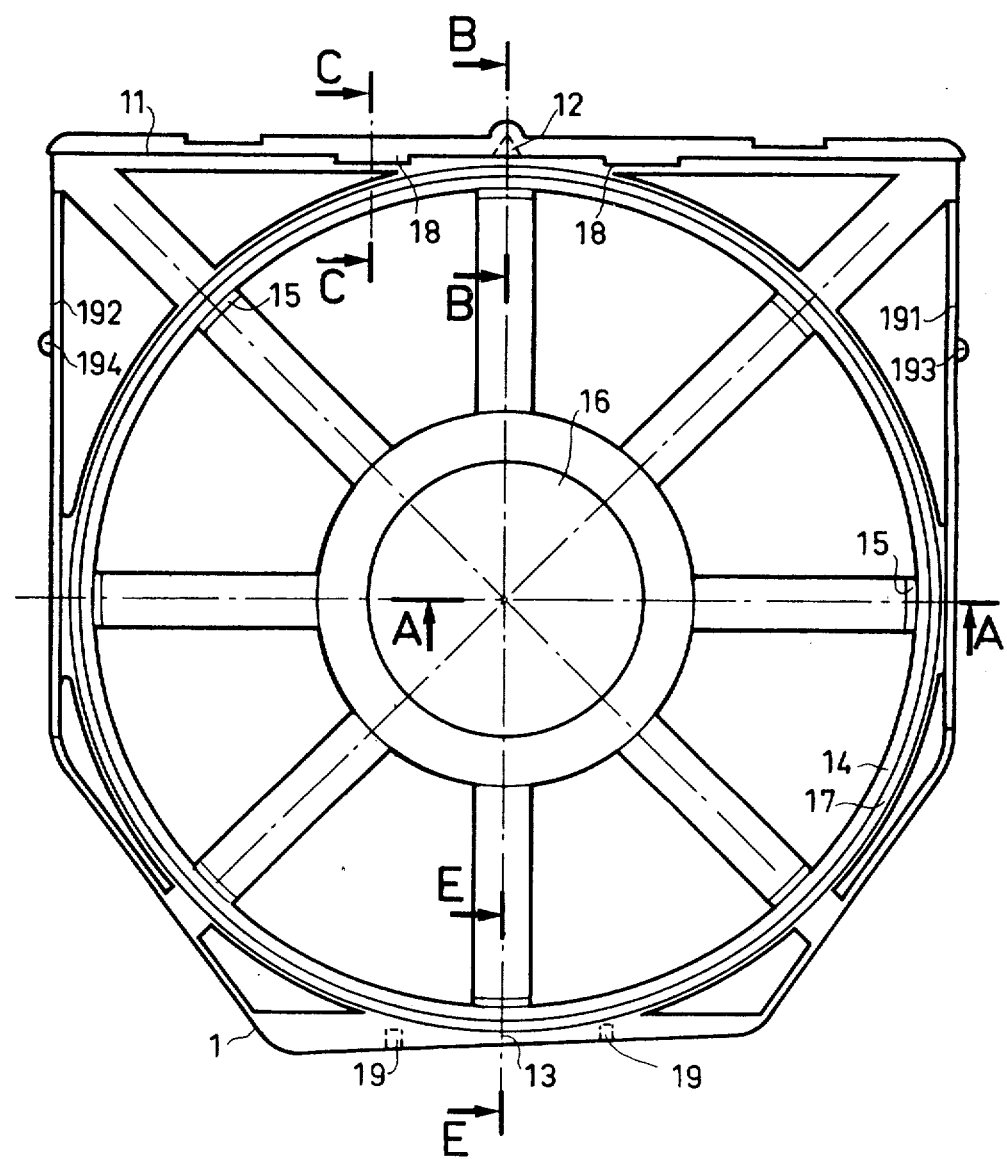
FIG. 2 illustrates the disk-holding plate of a cassette in accordance with the present invention.

In a practical embodiment in accordance with known art, use was made of a conventional PVC video disk having a thickness of 0.15 mm, a diameter of 300 mm, a central hole with a diameter of 15 mm and recorded on one side between two circles of diameters 296 mm and 120 mm. A label was glued as shown in FIG. 2, having a central hole of diameter 20 mm and possessing ten 10 mm diameter steel lands having a thickness of 0.06 mm and evenly distributed on a circle having a diameter of 90 mm. This label with its lands weighed approximately 5 g.

The present invention, whilst retaining the advantages of the approach described above, proposes a cassette arrangement, also comprising a plate and envelope, which can also protect an optical disk recorded on both sides. The arrangement of this cassette is such that there is no rubbing against the areas of the disk carrying recorded information during handling, storage and transportation as well as during insertion of the disk into or removal of the disk from the reader. In the following text, the areas of the disk carrying information is referred to as the recorded areas, without limiting the present invention to a particular process of recording data on a disk. The cassette also protects the disk from dust during storage outside of the reader.

A practical example of a plate in accordance with the invention is described with reference to FIG. 2. This plate is preferably an injection moulding in plastic. This plate 1 is generally rectangular in shape with recesses in certain parts, and whose average thickness is 1.2 to 1.4 mm. This plate possesses a shoulder 11 against which butts the open edge of the envelope as described later. This shoulder 11 possesses a triangular recess 12 in its bottom surface, allowing the plate to be hooked by a retractable stud attached to the reader. The thickness of this shoulder, which is referred to as the front part, is approximately 12 mm, this dimension having been adopted for reasons of compatibility with present readers. This parameter is no way limits the present invention. This thickness also determines the overall thickness of the cassette, but may be decreased by approximately 50% if it is required to reduce the volume taken by the cassette especially during storage when out of the reader.

The rear part of the plate 13 has been tapered to facilitate insertion of the plate into the envelope. A cavity 14 is provided in the top surface of the plate to take the disk. The depth of this cavity should match the thickness of the disk inserted in the cassette. As a non-restrictive example certain flexible disks in present use have a thickness of approximately 150 microns. The depth of the cavity may also be increased for storing and protecting rigid disks recorded on both sides and whose thickness is considerably more than that of flexible disks.

Figure 5:
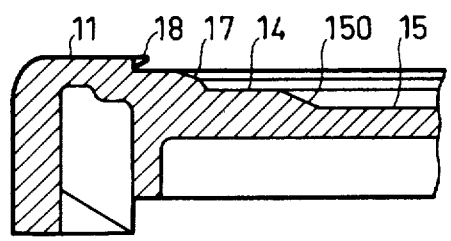

The disk is centered in cavity 14 which a clearance of approximately 0.5 mm, and the edge of the cavity is cut at 20° as shown in greater detail in FIG. 5 (detail of the section through BB in FIG. 2). In order to prevent the recorded area of the disk from rubbing on the plate, and this constitues one of the main features of the present invention, an annular recess 15 having a depth of 1 to 1.5 mm and internal and external diameters $\phi_i$ and $\phi_e$ compatible with those of the recorded area of the disk is provided at the bottom of cavity 14.

As an example, known disks have an overall diameter of approximately 301 mm and the following characteristics:

$293 < \phi'_e < 294$ mm $109 < \phi'_i < 110$ mm where diameter $\phi'_e$ corresponds to the start of the recording and diameter $\phi'_i$ corresponds to the end of the recording.

The transition between the bottom of the cavity 14 and the bottom of the annular recess 15 has a gentle slope 150 on diameter $\phi'_e$ of the disk to prevent disk 3 from catching on any asperity.

In order to let through the shaft of the motor driving disk 3 in rotation when the plate is inserted into the reader, a central hole 16 (FIG. 2) is provided in the plate.

Finally, a conical bearing surface 17 is provided around the edge of cavity 14, on which presses a matching conical bearing surface moulded on one of the inside surfaces of the envelope, as described below.

As mentioned above, plate 1 is recessed in all its non-functional areas in order to minimize its production cost. In addition, as a non-restrictive example, the material used for its manufacture may be selected amongst the following: polyamide, anti-static treated and shock-resistant ABS.

Figure 3:
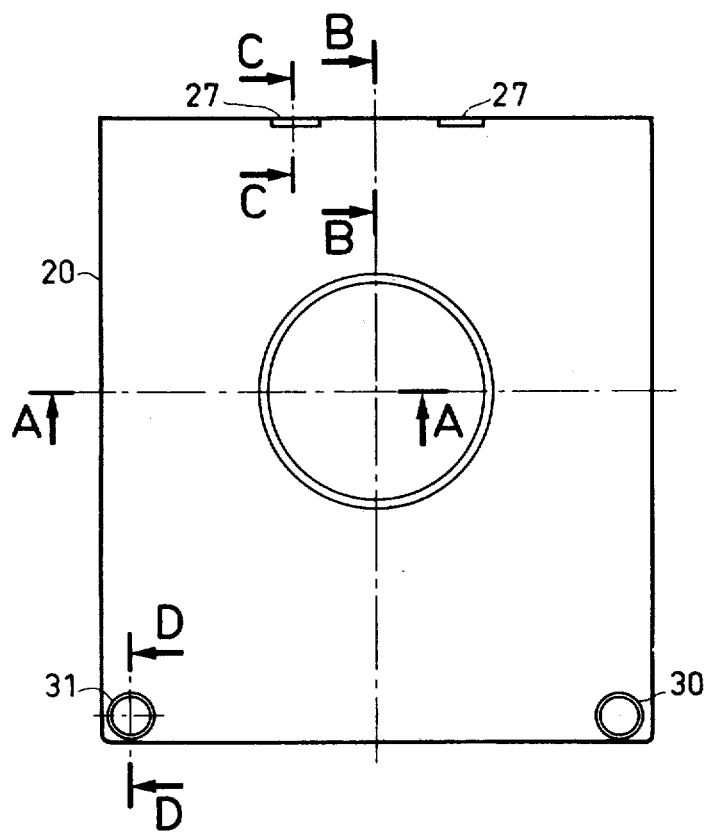
FIG. 3 illustrates an envelope for the plate in FIG. 2.
Figure 4:
FIGS. 4 to 10 illustrate in detail various aspects of the invention.

The envelope 2 is described with reference to FIGS. 3 and 4 (sections through AA), representing an overall view and a half-section of the envelope 2 respectively. This envelope comprises a cover 20 of particular shape and comprising itself surfaces 21 and 22 constituting bearing planes for the disk when the cassette is turned over with respect to the position shown in FIG. 4, and an annular recess 23 corresponding to diameters $\phi'_i$ and $\phi'_e$ corresponding to the end and start respectively of the recording. The cassette also comprises a rear edge not shown, a bottom surface 25 and side walls (24, for example), the part opposite the bottom surface being left open to allow insertion of the plate into the envelope 2.

Figure 6:
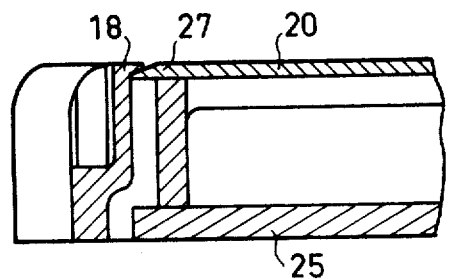

On the front part of the cassette, the envelope also comprises a conical bearing surface 26 for bearing against the corresponding conical part 17 of the plate as a result of additional shapes 18 and 27 in the front part of the plate and the front part of the envelope cover respectively, as illustrated by the detail in FIG. 6. This figure is a partial section through CC of FIG. 2.

Figure 7:
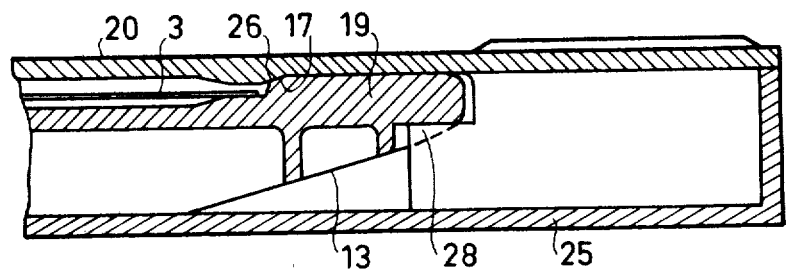

Similarly, on the rear part of the cassette, illustrated by FIG. 7 (partial section through EE of FIG. 2), additional shapes 19 and 28 provided on the plate and envelope respectively ensure contact between the conical bearing surface 17 and the conical bearing surface 27.

The following describes the interaction between the two main parts of the cassette: plate 1 and envelope 2, especially when inserting the cassette into or removing it from the disk reader. The envelope 2 slides on the two surfaces of plate 1, pinching the latter when closed.

Figure 8:
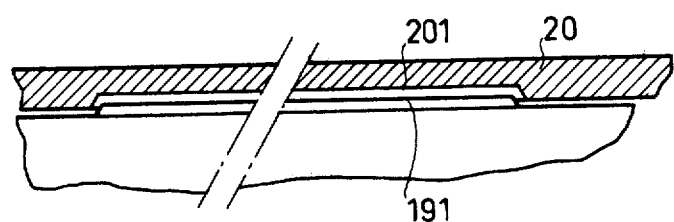

This action is facilitated by ramps 191 and 192 (FIG. 2) provided either side of the plate. Ramp 191 is illustrated in greater detail in FIG. 8.

An additional groove, such as 201, is provided in the cover 20 of the envelope 2 and fits on the ramp 191.

A clip arrangement then locks the envelope 2 and plate 1 to avoid accidental opening in the event of careless handling. For this purpose, protrusions 193 and 194 are provided on the sides of plate 1.

Figure 9:
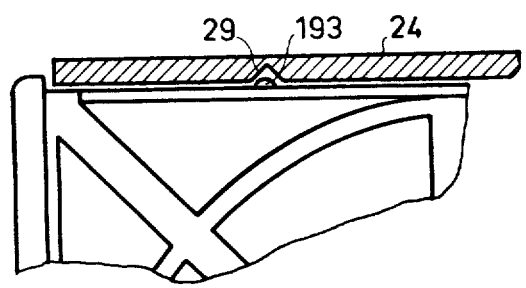

Protrusion 193 is illustrated in greater detail in FIG. 9. Vertical grooves, such as 29 shown in FIG. 9, are provided in the side walls of the envelope 2. Locking then occurs by penetration of the protrusions into these vertical grooves.

As indicated above, the internal surface 23 of the envelope facing the disk 3 has the same shape as that of recess 15 in the thickness of the plate such that only the unrecorded parts of the disk 3 touch, independent of the orientation of the cassette in space.

Depending on whether the cassette is inserted with one side or the other facing upwards, the disk 3 is centered in the cavity 14 of the plate 1 and rests either on the plate or on the internal surface of the envelope cover and, in both cases, there is no contact with recorded areas of the disk.

When the envelope 2 is closed on plate 1, contact between the envelope and plate is ensured by the pressure of additional shapes 18 and 27 as described above with reference to FIG. 6. For this reason, the envelope and plate constitute a dustproof compartment. In addition, when the envelope 2 is closed on plate 1, the conical bearing surface 17 provided around cavity 14 of plate 1 bears on the conical surface 26 provided on the internal surface of the envelope 2. This contact creates a conical barrier preventing the disk 3 from sliding between the envelope 2 and plate 1, which would destroy the disk. The cone angle is such that the sliding of the envelope 2 on the plate when opening the cassette is accompanied by spreading of the two lips of the envelope, these lips being constituted by the cover 20 and the bottom surface 25, by distortion of the plastic by approximately 1 mm. This value is for a cassette whose other dimensions are those described above.

When it is required to read the disk 3 contained in the cassette, the latter is inserted into a slot in the reader. A system specific to the reader extracts the plate 1 carrying the disk 3 from the envelope 2. The sliding of the two conical surfaces 17 and 26, one on the other, elastically distorts one of the surfaces of the envelope such that it does not rub on the surface of the disk 3 facing it. The sliding ramps 191 and 192 provided on the plate also assist this function by transferring the clearance required for this sliding onto the side of the plate carrying the disk. During this phase, known as the envelope extraction-insertion movement, the elastic distortion increases the thickness of the cassette by approximately 1 mm, as mentioned above. Plate 1 is extracted in a known manner by means of a stud fitting into the triangular recess 12 described above with reference to FIG. 2.

The disk reader, comprising in particular the mechanism mentioned above, does not come within the scope of the present invention and is not described. It is similar in every way to known readers.

Figure 10:
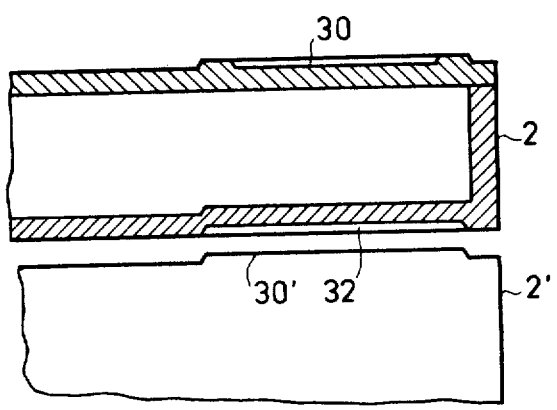

Finally, the stacking of cassettes one on top of another is achieved in a simple manner by means of two protrusions 30 and 31 (FIG. 3) provided on the cover of the envelope 2 and two recesses of matching shape in the bottom of this envelope 2. One of these protrusions 30 and one of these recesses 32 are shown in greater detail in FIG. 10 (section through DD). The two cassettes 2 and 2' are stacked one on top of the other by aligning the protrusions 30' with the corresponding recesses 32.

The present invention is not limited to the practical embodiments described above. Summarizing, the cassette in accordance with the present invention provides protection against any damage to optical disks recorded on both sides. It also enables disks to be read in an entirely automatic manner without any handling other than insertion of the cassette into the reader. Finally, it is sufficiently sealed to avoid degradation of information recorded on a stored disk by the introduction of foreign matter, such as dust, into the cassette.

Although particularly suitable for containing double-sided disks, this does not constitute a restriction to the invention, since all other types of disk, such as single-sided disks or multilayer disks may be kept in the cassettes described by the present invention. Such disks may also be ether flexible or rigid.

What is claimed is:

1. A cassette for an optical disk of the type comprising a plate possessing a first circular cavity for taking an optical disk and an envelope for containing the said plate, the envelope having an opening through which the plate may be inserted and the disk possessing a recording area on each side defined by two concentric circles of given first and second diameters, a second annular cavity being provided at the bottom of said first cavity of inner and outer diameters respectively less than and greater than those of the first and second given diameters, and in which a third cavity also of annular shape and of dimensions virtually equal to those of said second cavity is provided in the inner surface of the envelope cover, said second and third cavities being concentric when the plate is inserted in the envelope so that only unrecorded portions of said disk touch said plate or envelope independent of the orientation of said cassette in space.

2. A cassette in accordance with claim 1, in which additional conical bearing surfaces are provided around the edges of said first and third cavities, one bearing on the other when the plate is inside the envelope to define a dustproof compartment.

3. A cassette in accordance with claim 2, in which the plate possesses a shoulder of thickness virtually equal to the thickness of the envelope and intended for butting against the open edge of the envelope when the plate is inserted into the envelope, and in which additional shapes are provided on said shoulder of the plate and on the external surface of the envelope cover in order to provide pressure holding said conical surfaces together by elastic distortion of the envelope.

4. A cassette in accordance with claim 3, wherein the edge of the plate opposite said shoulder is tapered to facilitate insertion of the plate into the envelope and wherein this edge and bottom surface of the envelope have additional shapes also for applying pressure holding said conical bearing surfaces together by elastic distortion of the envelope.

5. A cassette in accordance with claim 1 comprising locking devices consisting of protrusions on the sides of the plate and matching recesses in the internal surfaces of the envelope side walls to take said protrusions when the plate is inserted into the envelope.

6. A cassette in accordance with claim 1, in which the plate is fitted with two proud peripheral ramps extending over a given length, and in which the envelope is also provided with two slots matching the shapes of said ramps, these ramps and slots interacting to facilitate correct insertion of the plate into the envelope by slightly spreading by elastic distortion the cover and bottom surface of the envelope when inserting the plate into or extracting the plate from the envelope.

7. A cassette in accordance with claim 1, in which the envelope is provided with matching protrusions and recesses on top of the cover and beneath the envelope to allow the stacking of several cassettes.

8. A cassette in accordance with claim 1, in which the envelope and plate are made of plastic material.

9. A cassette for an optical disk recorded on both sides between two concentric circles comprising:
   a plate having a first circular cavity for receiving said disk, a conical bearing surface around the edge of said first cavity, a second annular cavity at the bottom of said first cavity having inner and outer diameters respectively less and greater than the diameters of said circles and two peripheral ramps extending over a given length and
   an envelope having an opening through which the plate may be inserted, a conical bearing surface bearing on the conical surface of said plate when said plate is in said envelope, two slots matching the shapes of said ramps to facilitate correct insertion of the plate into the envelope by slightly spreading by elastic distortion of the top and bottom surface of said envelope and a third annular cavity of dimensions virtually the same as the dimensions of said second cavity in the inner surface of said envelope so that unrecorded portions of said disk touch said plate or envelope independent of the orientation of said cassette in space.

* * * * *